United States Patent
Frenkel et al.

(10) Patent No.: US 7,420,881 B2
(45) Date of Patent: Sep. 2, 2008

(54) INTERACTIVE SWITCHING DEVICE FOR A PORTABLE ELECTRONIC APPARATUS

(75) Inventors: Erik Jan Frenkel, Neuchâtel (CH); Jean-Charles Guanter, Diesse (CH)

(73) Assignee: ASULAB S.A., Marin (CH)

( * ) Notice: Subject to any disclaimer, the term of this patent is extended or adjusted under 35 U.S.C. 154(b) by 390 days.

(21) Appl. No.: 10/976,325

(22) Filed: Oct. 29, 2004

(65) Prior Publication Data

US 2005/0113940 A1 May 26, 2005

(30) Foreign Application Priority Data

Oct. 31, 2003 (EP) .................................. 03024851

(51) Int. Cl.
*G06F 3/02* (2006.01)
*G06F 1/26* (2006.01)
*G06F 1/32* (2006.01)

(52) U.S. Cl. ........................ 368/69; 368/82; 368/204; 345/169; 345/173; 713/320

(58) Field of Classification Search ......... 368/203–205, 368/223, 69, 82; 340/7.32, 7.38; 455/574; 713/320–324, 330, 340; 345/169, 173
See application file for complete search history.

(56) References Cited

U.S. PATENT DOCUMENTS

| | | | |
|---|---|---|---|
| 4,158,285 A | 6/1979 | Heinsen et al. | |
| 4,428,040 A | 1/1984 | Yamashiro | |
| 5,375,245 A * | 12/1994 | Solhjell et al. | ............... 713/320 |
| 5,559,761 A | 9/1996 | Frenkel et al. | |
| 5,627,882 A | 5/1997 | But et al. | |
| 5,767,594 A | 6/1998 | Cheng | |
| 5,913,067 A | 6/1999 | Klein | |
| 6,052,339 A | 4/2000 | Frenkel et al. | |
| 6,320,822 B1 | 11/2001 | Okeya et al. | |
| 6,526,433 B1 | 2/2003 | Chang et al. | |
| 6,590,835 B2 | 7/2003 | Farine et al. | |
| 6,713,994 B2 * | 3/2004 | Inaba | ......................... 323/283 |
| 7,031,143 B2 * | 4/2006 | Madsen et al. | ............... 361/680 |
| 2002/0091953 A1 * | 7/2002 | Min | ............................ 713/320 |
| 2003/0201915 A1 * | 10/2003 | Anderson et al. | ............... 341/22 |

FOREIGN PATENT DOCUMENTS

| | | | |
|---|---|---|---|
| EP | 1235122 A1 | 8/2002 | |
| EP | 1248165 A1 | 10/2002 | |

* cited by examiner

*Primary Examiner*—P. Austin Bradley
*Assistant Examiner*—Jeanne-Marguerite Goodwin
(74) *Attorney, Agent, or Firm*—Sughrue Mion, PLLC

(57) ABSTRACT

The device includes data entry means (10), control means (14) connected to means (12) for displaying said data. The invention is characterised in that it further includes a processing unit (16) inserted between the data entry means (10) and the control means (14). The processing unit (16) includes a memory (11) for storing reference times and particularly the Time Out, a counter (18) storing the time TC that elapses from the start of a manipulation and the time TM the elapses between two manipulations, and a comparator (21) including a first comparison unit (23), which acts on the one hand on an ON/OFF switch (24) to interrupt, via control means (14) the energy supply when TC>TO and which, on the other hand, enables TO to be altered at the end of a series of manipulations as a function of certain reference times of the memory and the speed at which the manipulations have been carried out.

15 Claims, 4 Drawing Sheets

INTERACTIVE SWITCHING DEVICE FOR A PORTABLE ELECTRONIC APPARATUS

This application claims priority from European Patent Application No 03024851.2 filed Oct. 31, 2003, the entire disclosure of which is incorporated herein by reference.

BACKGROUND OF THE INVENTION

The present invention concerns an interactive switching device for a portable electronic apparatus powered by a battery or an accumulator, which saves energy by not leaving the apparatus operating unnecessarily, and avoids wasting energy by inadvertently switching on an undesired function.

The device also enables the time to be altered before switching in order to allow a novice user to have sufficient time to carry out his manipulations on the portable electronic device, without risking any unintentional switching on.

DESCRIPTION OF THE PRIOR ART

There have already been known for a long time portable or non portable electronic devices, such as a computer, a pocket calculator or wristwatch, which are fitted with a timing device for interrupting the power supply after a determined period of non-use, for example after the last manipulation carried out on a keyboard. In certain cases, it is possible to programme the time delay after which the pre-programmed timing device interrupts the power supply, this delay remaining unchanged during a whole series of manipulations.

In order to obtain a reduction in energy consumption, for example in an electronic wristwatch, one can also act upon the power circuit inserted between the energy source and the time processing and display means, as is for example disclosed in U.S. Pat. No. 4,428,040.

In wristwatches numerous circuits and/or devices have also been designed for separating the time count (standby mode) from its display (active mode), which require much more energy. The simplest device consists of a push-button which the user presses only for the time necessary to read the time. U.S. Pat. No. 6,320,822 discloses another device in which the passage of an electronic apparatus into standby mode is carried out automatically when the apparatus is no longer being worn by the user, the example given being that of a wristwatch whose generator/detector is driven by an oscillating weight.

In these devices of the prior art, it can be seen that no interaction is provided between the electronic apparatus and a user to vary the time delay before switching on the standby mode, which is the most energy saving, as the user learns to perform more quickly at least two consecutive manipulations, or conversely in the case where another user would be slower to carry out this operation. No security is provided either for preventing an undesired function being unintentionally switched on when the apparatus remains operational for too long a period of time after the last manipulation.

BRIEF SUMMARY OF THE INVENTION

The invention thus concerns a device for saving the energy provided by the energy source of the electronic apparatus by switching off its data entry or time display means after a variable time delay, which will depend, from an initial pre-configured or stored value, on the skillfulness of the user. Thus, after a series of manipulations carried out by a skillful user, the authorised time period for a manipulation before switching off will decrease for the next series of manipulations. Conversely, a user who has been less skillful in carrying out a series of manipulations, or who becomes so accidentally, will have a slightly longer authorisation time before switching off for the next series of manipulations. The maximum time authorised between the start and the end of a manipulation before switching off will be designated hereinafter "Time Out", or TO by abbreviation.

If the data entry means are of the touch type, i.e. when they are formed by sensors activated by contact with a finger, "the duration period of a manipulation" means the time elapsed between the moment when the user lifts his finger from a sensor and when he places it on another sensor, the time during which he holds his finger on a sensor not being counted.

It is of course possible, depending on the electronic apparatus in which the device according to the invention is integrated, to define the "duration period of a manipulation" differently. It is for example possible, contrary to what was stated hereinbefore, to count the time in said "duration period" the time during which a user keeps the sensor active before carrying out an action determining the manipulation time TM.

In the following description, TM thus designates a "manipulation time" in accordance with one or other of the above definitions, or others within the grasp of those skilled in the art. The time that elapses between two manipulations will be designated TC hereinafter, and that stored at the start of the next manipulation TM. In order to better understand the invention, the longest time stored between two successive manipulations in a series of manipulations will be designated TX (Time Max) and a security time whose essential role will be explained hereinafter, will be designated TS.

The invention thus concerns an interactive switching device for a portable electronic apparatus, such as a wristwatch, powered by a battery or an accumulator, including data entry means, for example in the form of a keyboard or a touch alphanumerical screen, and control means connected to means for displaying said data. The invention is characterised in that the device further includes a processing unit inserted between the data entry means and the control means. The processing unit includes a memory for storing reference times, particularly the Time Out, a counter connected to a time base storing times TC and TM and a comparator including a first comparison unit, which acts, on the one hand, on an ON/OFF switch to interrupt, via control means, the energy supply to the data entry and display means when TC>TO and which, on the other hand, alters, at the end of a series of manipulations, certain reference times of the memory as a function of the speed at which the manipulations are carried out.

The memory includes four zones. A first zone stores security time TS which is a fixed value, stored when the electronic apparatus is manufactured, but which the user may alter by manipulating an external control member, or which can be recalculated at the end of a series of manipulations as a percentage of the value of the last TOM defined hereinafter.

A second zone is formed by a shift register TOM, the value of which, recorded in the last line at the end of a series of manipulations is the value TX stored in a third zone. At the end of a series of manipulations, a new TO is stored for the next series of manipulations in a fourth zone, said new TO being the sum of TS and the arithmetical mean of the values recorded in register TOM, which can be expressed: TO=TOM+TS.

It thus appears that the invention is characterised in that the fixed value of TS, for a series of manipulations, allows, for a new series of manipulations, A larger TO than the preceding TO, when TOM increases.

In a preferred application, the interactive switching device according to the invention is integrated in a electronic wristwatch, the display means, such as an analogue display via hands or a liquid crystal digital display, being carried by the dial and the data entry means being formed by a screen including touch keys with transparent electrodes carried by the glass. The keys can also be integrated in the bezel, the case or the wristband if they are of the capacitive or resistive touch type, or they can be formed by pressure-sensitive contacts.

BRIEF DESCRIPTION OF THE DRAWINGS

Other features and advantages of the present invention will appear upon reading the description of a wristwatch taken by way of illustrative and non-limiting example of an application of an interactive switching device according to the invention, with reference to the annexed drawings, in which.

DETAILED DESCRIPTION OF THE INVENTION

Figures 1, 1B:
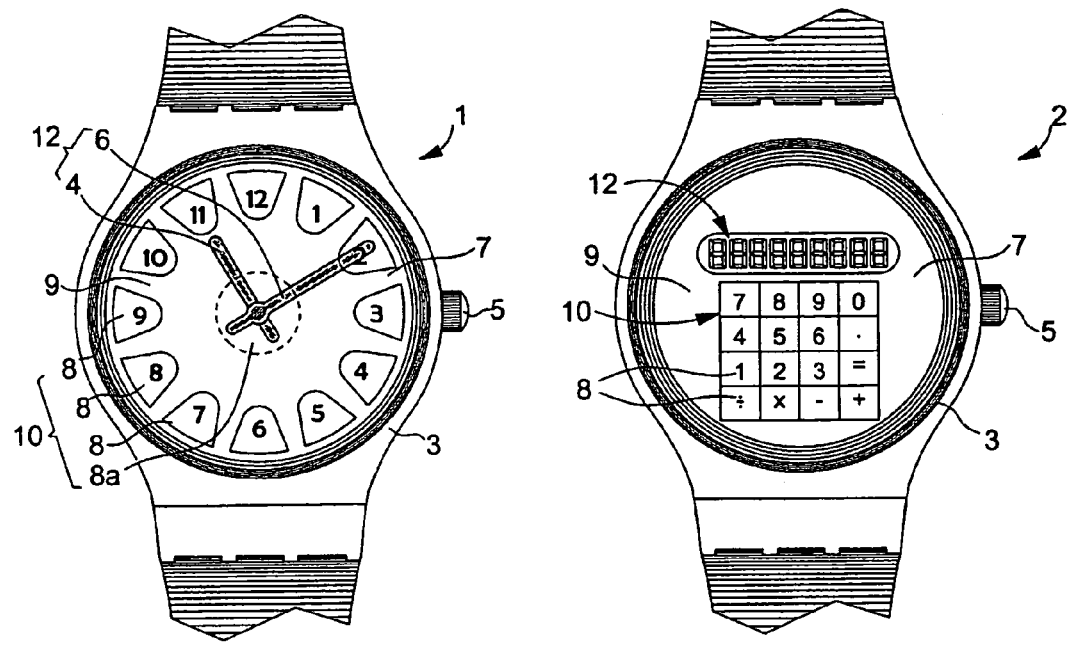
FIG. 1 shows a wristwatch with touch control and reading of the time functions.
FIG. 1b shows a wristwatch-calculator.

FIG. 1 shows by way of example a wristwatch with touch control and reading of the time functions described in more detail in U.S. Pat. No. 5,559,761 and U.S. Pat. No. 6,052,339. It includes basically a case 3 enclosing a watch movement (not shown) powered by a battery or accumulator 22, for displaying a time indication 12 by means of hands 4, 6 arranged above a dial 9. This wristwatch has the peculiarity of possessing, on its glass 7, data entry means 10 formed by tactile keys 8 with transparent electrodes arranged on the periphery of the glass above the twelve time indices and possibly another touch key 8a at the centre of the glass. Equally, keys 8 whether of the touch type or not could be distributed over the bezel or on the middle part. In order to have access to a time function, such as reading the current time, or adjusting an alarm time, after switching on, for example by means of action exerted on crown-pushbutton 5, a series of manipulations has to be carried out by passing a finger over sensors 8, in order for the information to be delivered, either visually by hands 4, 6, or in the formed of encoded vibrations perceptible to the finger and/or the wrist if it is a wristwatch that is also intended for the visually impaired.

It is of course clear, on the one hand, that all the users will not have the same dexterity for carrying out the manipulations one after the other, on the other hand that they may be capable by learning to go faster and faster, or conversely that a lesser "performance" may be carried out by a new user, which means that a satisfactory standard time period before switching off cannot be installed in the device in all cases, particularly when one wishes to save energy.

The foregoing also applies to the watch-calculator shown in FIG. 1b in which the display means 12 are formed by a digital liquid crystal screen and data entry means 10 by an alphanumerical keyboard including sixteen touch keys 8 of the capacitive or resistive type. The keyboard can even include a larger number of keys for writing a message as disclosed for example in EP Patent No. 1 235 122. The keyboard can also be integrated in the bezel, the case or the wristband strands as disclosed in U.S. Pat. No. 6,590,835 and EP Patent No. 1 248 165. In all of these cases, it is certainly even more difficult to fix, a priori, a standard manipulation time for one key 8 to another, unless a very long pre-switching off is established, as is the case with table calculators.

Thus, to save energy, or prevent a false manoeuvre, the energy supply to data entry means 10 and display means 12 has to be cut off within a "reasonable" time delay, i.e. neither too long, nor too short so as not to interrupt a series of manipulations, this delay designated "Time Out" hereinafter, by abbreviation "TO", being variable from one individual to another, and able to evolve for the same individual.

Figure 2:
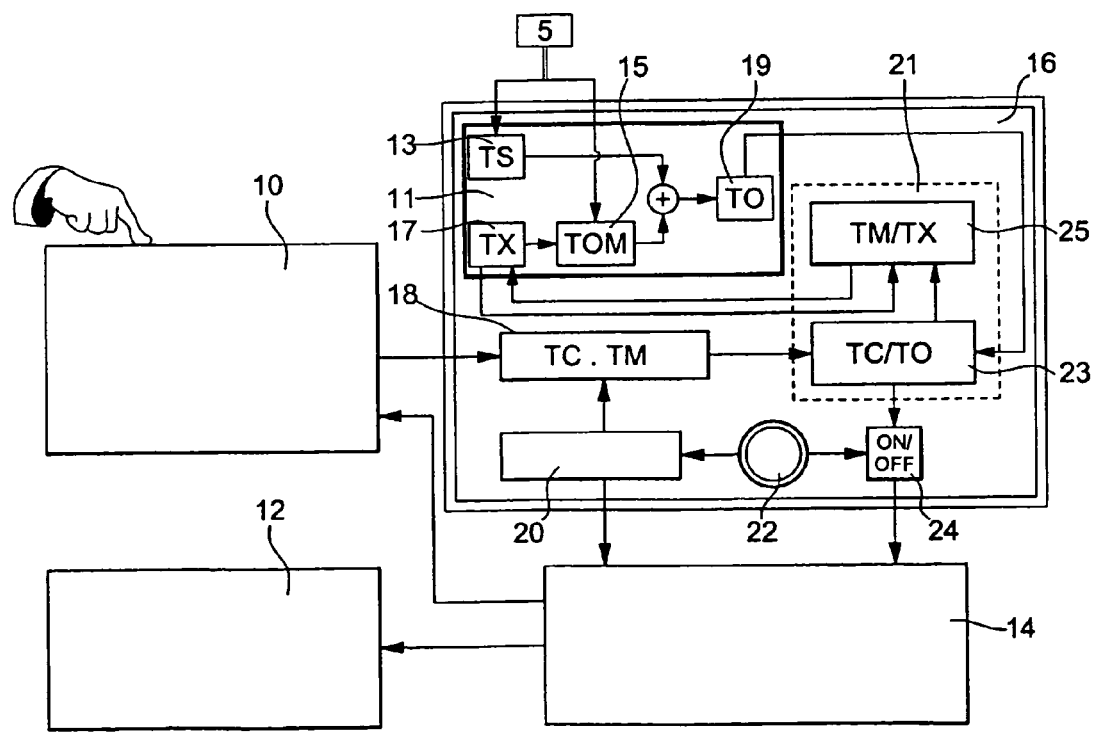
FIG. 2 shows a block diagram of an implementation of the interactive switching device.

The device according to the invention thus aims to adapt this "Time Out" automatically and to switch off in an interactive manner the supply to data entry means 10 and display means 12 as is now explained with reference to the block diagram of FIG. 2.

In addition to the aforecited data entry means 10 and display means 12, the device includes control means 14 for controlling display means 12, and a processing unit 16, inserted between said control means 14 and data entry means 10.

Processing unit 16, which forms the core of the device, includes three essential elements, namely a memory 11, a counter 18, which receives signals from data entry means 10, and a comparator 21 made up of two units 23 and 25 in cascade. In the diagram of FIG. 2, there is also shown a time base 20 communicating time signals to counter 18, a battery or accumulator 22, connected both to time base 20 and to a switch 24 of the device.

Memory 11 includes four interconnected zones 13, 15, 17 and 19 having quite distinct functions.

A first zone 13 is for storing, during manufacturing of the device, the security time TS which forms the key element for varying the Time Out from one series of manipulations to another. This TS value can be manufacturing standard that cannot be altered by the user. It is also possible to envisage varying the TS value by an appropriate action carried out by means of an external control member, symbolised by crown-push-button 5, or by recalculating its value from other characteristic durations of the device. By way of example, we will take TS=2 seconds hereinafter, although other choices are possible.

A second zone 15 is formed by a shift register in which the same time or duration is recorded on all the lines at the start of the first series of manipulations. By way of example, it will be assumed hereinafter that, at the start of a series of manipulations, register 15 includes 10 lines each corresponding to 10 seconds, i.e. to a mean value of 10 seconds designated Mean Time Out, or TOM by abbreviation. In this example, it can be seen that TS represents 20% of TOM.

After several series of manipulations, the values recorded in each line will be altered and the value recorded in the last line, namely that which will be introduced at the end of each series of manipulations, corresponds to a time or duration Time Max, by abbreviation TX, established by the second unit 25 of comparator 21 as a function of the longest time TM of the last series of manipulations. It is clear that at the start of a series of manipulations TX has a value of zero. The value of TX established over a series of manipulations, is stored in a third zone 17 to be transferred into zone 15 at the end of the manipulations.

The memory includes finally, a fourth zone 19 for calculating the Time Out for the next series of manipulations as being equal to the sum of TS+TOM i.e. by referring to the values given by way of example TO=2 s+10 s=12 seconds.

Thus, if one manipulation is considered in a series of manipulations, counter 18 transmits to the first unit 23 of comparator 21 a time or duration TC which is compared to TO. If TC becomes greater than or equal to TO, a signal is transmitted to ON/OFF switch 24 to interrupt, via control means 14, the energy supply to data entry means 10 and display means 12. If, conversely, TC<TO, this means that the manipulation was smaller than the authorised Time Out and the corresponding TM value will be compared in the second unit 25 of comparator 21 to value TX. In the preferred embodiment, when TM is greater than TX, TM becomes the new TX value for the following manipulation. If, conversely, TM is less than TX, the TX value is unchanged.

At the end of a series of manipulations, i.e. when TC becomes greater than TO, TX is introduced into shift register 15, and the oldest value is removed. A new TOM value is then calculated as previously indicated by an arithmetical mean of all the values stored in shift register 15, the value of TS is then added to said mean to establish the new Time Out for the following series of manipulations.

It may happen that a skillful user having brought his TO, for example to 5 seconds, lends his wristwatch to a novice user who will not manage to carry out in succession the manipulations he wishes to make with such a short TO. In addition to the actual device of the invention, a particular manipulation of crown-push-button 5 could thus also reinitialise the values stored in shift register 15 at the moment of the first use, i.e. in our example to 10 seconds by line allowing the Time Out to be returned to its initial value, namely 12 seconds. The lines of register 15 could also be incremented or decremented freely, possibly by means of another control member that is not shown, to choose another TOM and thus another initial TO.

With reference now to the flow charts shown in FIGS. 3, 4 and 5, it will be shown hereinafter how the Time Out TO is adapted to the level of skill of the user. The examples show more specifically the operation of the device according to the invention shown in FIG. 1 for a wristwatch with touch control and reading of the time when the initial Time Out is TO=TS+TOM=2 s+10 s=12 s.

EXAMPLE 1

Figure 3:
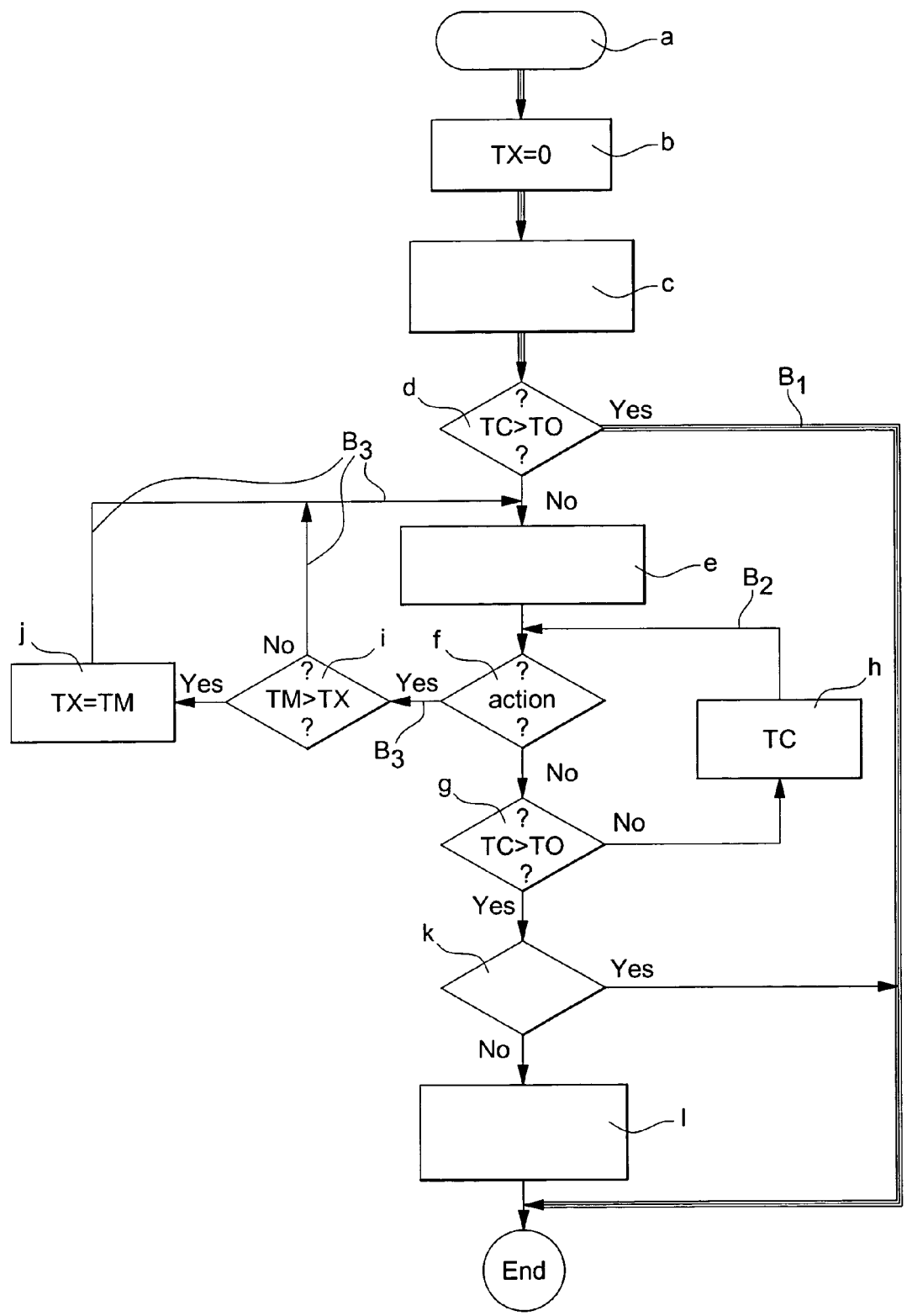
FIG. 3 shows a flow chart of the device implemented in FIG. 2, when there is no manipulation carried out after starting.

Starting Without Manipulation (FIG. 3)

Step a corresponds to starting, recalling at b that at the start of a series of manipulations the Time Max is TX=0. At c the device is waiting for the start of the first series of manipulations counting down the time TC which elapses from the start to compare it at d to TO. When TC becomes greater than TO, i.e. 12 s, switching off occurs and leads via loop B1 to the end of the series of manipulations. Since no manipulation time TM has been stored, the values contained in the memory are unchanged and the Time Out for the next series of manipulations will still be 12 s.

EXAMPLE 2

Figure 4:
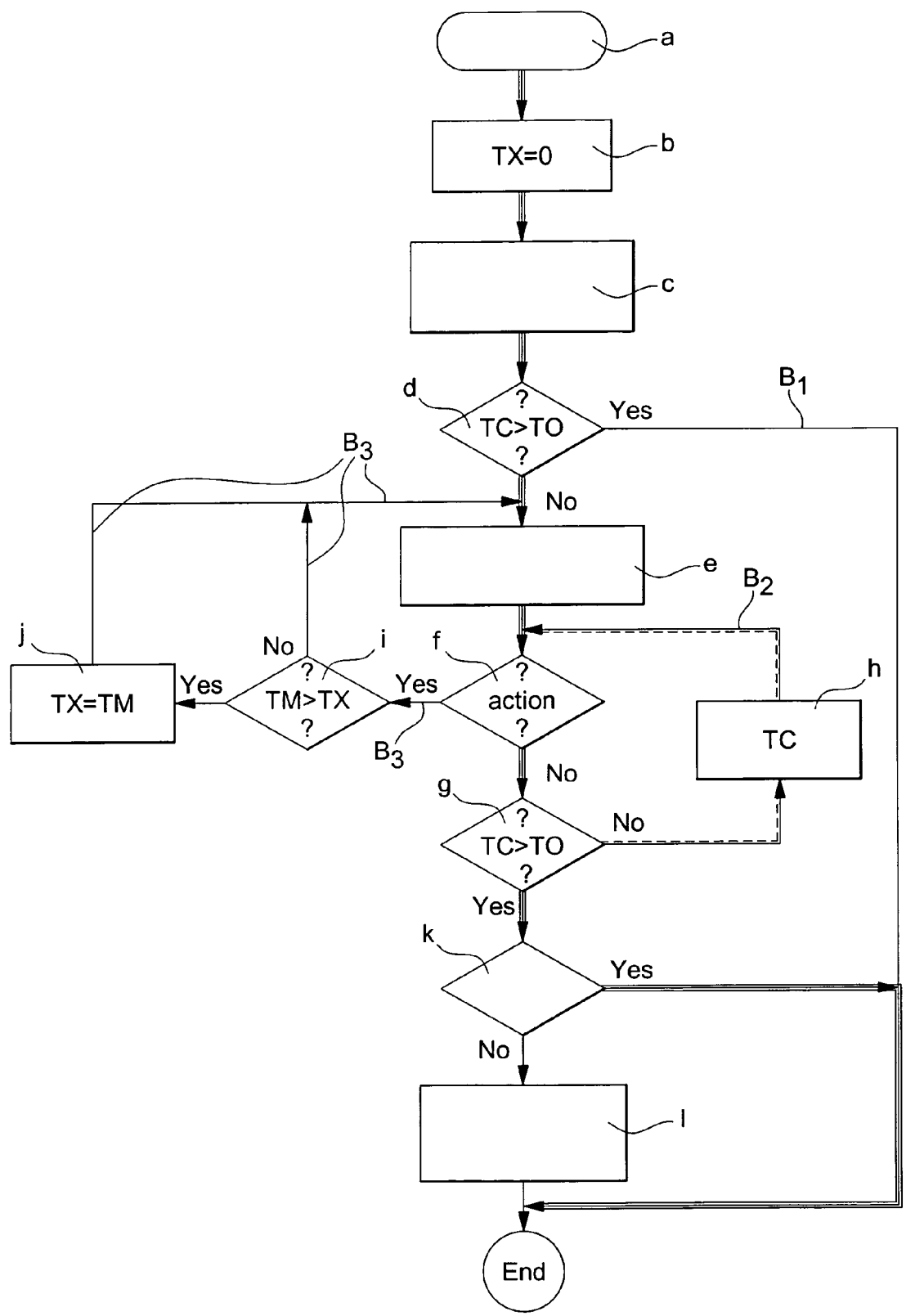
FIG. 4 shows the same flow chart as that of FIG. 3, when a manipulation is carried out.

Starting and a Single Manipulation (FIG. 4)

This may be for example, a visually impaired person, who wishes to check the state of his wristwatch alarm by pressing on a single touch key, for example on key 8a at the centre of the dial, which can form the control member for this function. This manipulation thus does not allow a manipulation time TM to be defined. Referring to FIG. 4, since the current time TC is not greater than the Time Out, in step d the device waits for the end of the manipulation action until the finger is raised again. If there is no following action in step f, step g checks whether the Time Out has elapsed. Loop $B_2$ simply shows that this check is carried out in a loop. If step g determines that TO has elapsed, step k determines that a single action has been carried out and returns to end of manipulation loop $B_1$, in the parameters memory remaining, as in the preceding example, unchanged.

It be observed that, according to another arrangement of processing unit 16, the start could be taken into account as the first manipulation action, which would correspond to example 3, which follows.

EXAMPLE 3

Figure 5:
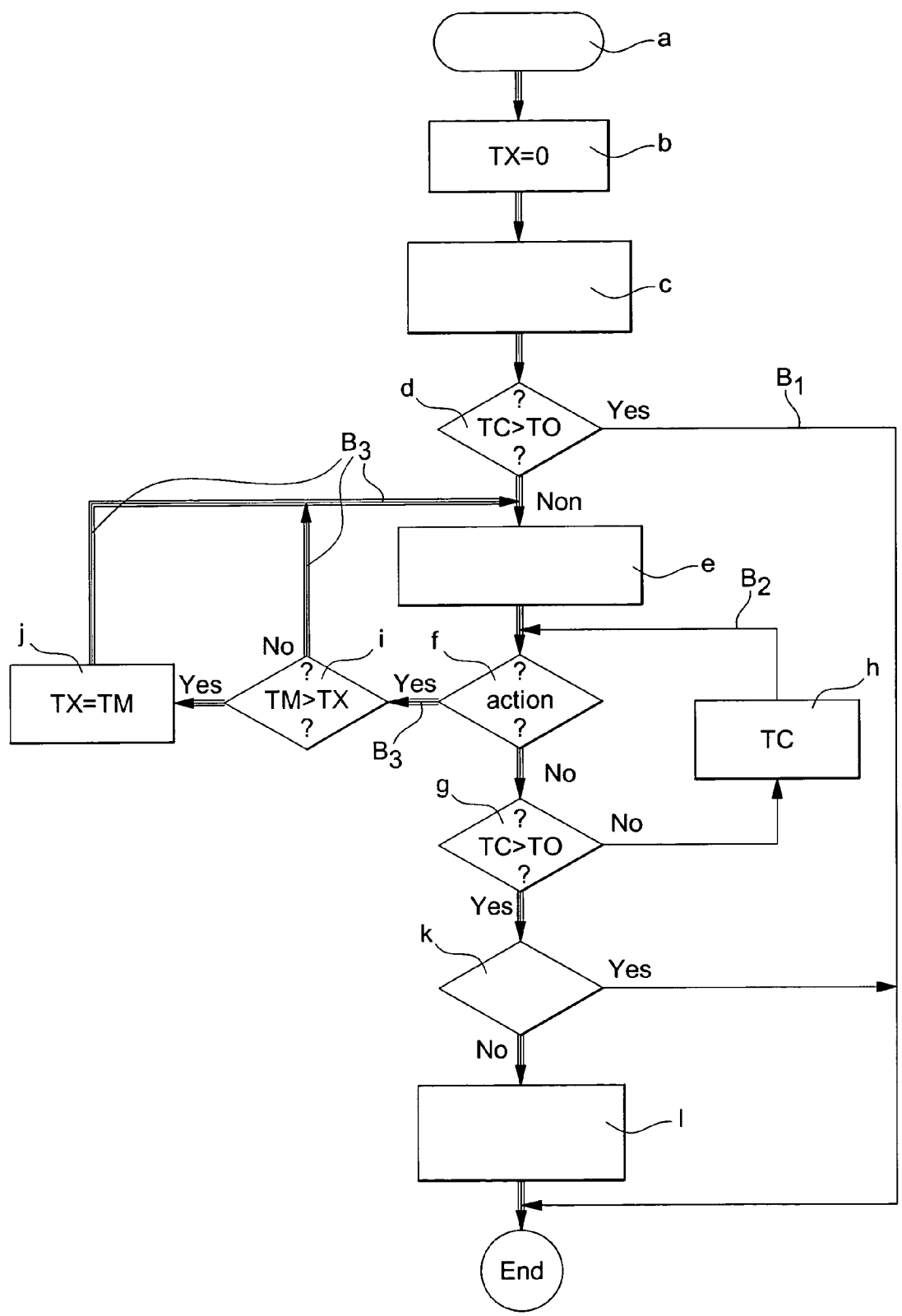
FIG. 5 shows the same flow chart as that of FIG. 3, when several manipulations are carried out.

Start and a Series of Several Manipulations (FIG. 5)

This may be, for example, a user who wishes, by means of the touch keys, to set the time of his wristwatch, by placing his finger on a touch key to move the hour hand, then by doing the same with the minute hand, but taking several attempts, i.e. making several errors.

Referring to FIG. 5, it can be seen that in step f there is an action for defining a pause time between the manipulations TM which will be compared by loop $B_3$ in step i to Time Max. If TM>TX, said value TM will become the new TX value. If, conversely, TM<TX, the TX value will be unchanged. Loop $B_3$ will continue for as long as values TM can be counted at each new manipulation. At the end of the series of manipulations, the shift register takes into account this TX value and removes the oldest of the other values stored in said register. A new TOM is calculated in step I, and a new TO is established, as explained hereinafter by examples 4 and 5 referring to an experienced user, then to a novice user still within the hypothesis of an initial Time Out of 12 s, assuming that there are three series of manipulations.

EXAMPLE 4

Experienced User

The experienced user carries out the first series of manipulations to reach the end of manipulations at a TX of 5 seconds, the second at a $TX_2$ of 8 seconds, and third at a $TX_3$ of 4 seconds, which enables the shift register to be represented by Table 1.

| Line | Initial state | After $TX_1$ | After $Tx_2$ | After $TX_3$ |
|---|---|---|---|---|
| 9 | 10 | 10 | 10 | 10 |
| 8 | 10 | 10 | 10 | 10 |
| 7 | 10 | 10 | 10 | 10 |
| 6 | 10 | 10 | 10 | 10 |
| 5 | 10 | 10 | 10 | 10 |
| 4 | 10 | 10 | 10 | 10 |
| 3 | 10 | 10 | 10 | 10 |
| 2 | 10 | 10 | 10 | 5 |
| 1 | 10 | 10 | 5 | 8 |
| 0 | 10 | 5 | 8 | 4 |

The value 5 is stored in the last line after the first series of manipulations. After the second series of manipulations, it records the value 8, and after the third series of manipulations the value 4 occupies the last line.

For the following series of manipulations, the new TOM will thus be TOM=87/10=8.7 s and the Time Out will have lowered to TO=8.7+1=10.7 s when TS=2 s is a fixed value that cannot be changed.

If, however, a new TS value is recalculated in percentage (20%) of TOM the new Time Out value will be TO=8.7+0.2× 8.7=10.44 s.

EXAMPLE 5

Novice User

After his three series of manipulations, the novice user obtains the values $TX_1$=11 s, $TX_2$=11 s and $TX_3$=12 s, i.e. the last three lines of the register will have the value 11 s, 11 s, 12 s.

For the next series of manipulations, the new TOM will thus be TOM=104/10=10.4 s and the Time Out will have been raised to TO=12.4 s, respectively 12.48 s.

The values given in examples 4 and 5 are illustrative, since it is evident that greater Time Out variations could be observed around its initial value by having a larger number of series of manipulations or a smaller number of lines in register 15. Thus, in example 4, if the register had only 5 lines, the new Time Out would have been returned to 9.4s, respectively 8.88 s.

Other variants of the device may be imagined by those skilled in the art, without departing from the scope of the present invention.

What is claimed is:

1. An interactive switching device for a portable electronic apparatus powered by a battery or an accumulator and including:
   data entry means enabling a user to select data or functions by successive manipulations;
   display means arranged to provide information representative of the data corresponding to the manipulation carried out;
   control means connected to the display means and arranged so as to provide a command representative of said data, wherein it further includes a processing unit inserted between the data entry means and the control means, said processing unit including a memory for storing reference times or durations and particularly the maximum time or duration authorised between the start and end of a manipulation, designated by "Time Out", "TO" by abbreviation, a counter connected to a time base storing the time that elapses between two manipulations which is designated by "TC" and the total elapsed time "TM" between two manipulations, and a comparator including a first unit, which acts on an ON/OFF switch to interrupt, via control means the energy supply to the data entry means and the display means, when TC>TO and which enables certain reference times or durations of the memory to be continuously altered at the end of a series of manipulations, among which certain reference times or durations is the maximum time or duration "TO" authorised between the start and end of a manipulation.

2. The device according to claim 1, wherein it further includes an external control member which, whatever the number of series of manipulations previously carried out, allows the TO to be brought to its initial value, or to be altered to make it higher or lower.

3. The device according to claim 2, wherein the TO is altered by means of the control member, by changing the value stored in each line of the shift register of the memory.

4. The device according to claim 1, wherein the data entry means are formed by a keyboard including digital or alphanumerical keys.

5. The device according to claim 4, wherein the keys are of the touch, capacitive or resistive type.

6. The device according to claim 4, wherein the keys are formed by pressure sensitive contacts.

7. An interactive switching device for a portable electronic apparatus powered by a battery or an accumulator and including:
   data entry means enabling, a user to select data or functions by successive manipulations;
   display means arranged to provide information representative of the data corresponding to the manipulation carried out;
   control means connected to the display means and arranged so as to provide a command representative of said data, wherein it further includes a processing unit inserted between the data entry means and the control means, said processing unit including a memory for storing reference times or durations and particularly the maximum time or duration authorised between the start and end of a manipulation, designated by "Time Out", "TO" by abbreviation, a counter connected to a time base storing the time that elapses between two manipulations which is designated by "TC" and the total elapsed time "TM" between two manipulations, and a comparator including a first unit, which acts on an ON/OFF switch to interrupt, via control means the energy supply to the data entry means and the display means, when TC>TO and which enables certain reference times or durations of the memory to be continuously altered at the end of a series of manipulations,
   wherein the memory includes a first zone for storing a security time "TS", a second zone formed by a shift register, a third zone for storing a "Time Max", "TX" by abbreviation, having a value established in a second unit of the comparator by comparison with the last TM, said TX value being stored in the last line of the shift register at the end of a series of manipulations, and a fourth zone for calculating and storing the TO of the following series of manipulations at a value corresponding to TO=TOM+ TS, wherein "TOM" designates by abbreviation the "Mean Time Out" corresponding to the arithmetical mean of the values stored in the register.

8. The device according to claim 7, wherein TS is a value peculiar to the device during its manufacturing and unable to be altered.

9. The device according to claim 7, wherein TS is a value peculiar to the device during its manufacturing and able to be altered, either by manipulating an external control member, or by defining the new TS as a percentage of the last TOM.

10. The device according to claim 7, wherein, during a series of manipulations, TM becomes the new TX value when a TM value is greater than the last TX value.

11. The device according to claim 7, wherein, during a series of manipulations, TM remains less than the TX value, said TX value remains unchanged.

12. An interactive switching device for a portable electronic apparatus powered by a battery or an accumulator and including:
   data entry means enabling a user to select data or functions by successive manipulations;
   display means arranged to provide information representative of the data corresponding to the manipulation carried out;

control means connected to the display means and arranged so as to provide a command representative of said data, wherein it further includes a processing unit inserted data entry means and the control means, said processing unit including a memory for storing reference times or durations and particularly the maximum time or duration authorised between the start and end of a manipulation, designated by "Time Out", "TO" by abbreviation, a counter connected to a time base storing the time that elapses between two manipulations which is designated by "TC" and the total elapsed time "TM" between two manipulations, and a comparator including a first unit, which acts on an ON/OFF switch to interrupt, via control means the energy supply to the data entry means and the display means, when TC>TO and which enables certain reference times or durations of the memory to be continuously altered at the end of a series of manipulations, wherein the display means are formed by hands.

13. The device according to claim 1, wherein the display means are formed by a liquid crystal digital display.

14. An interactive switching device for a portable electronic apparatus powered by a battery or an accumulator and including:

data entry means enabling a user to select data or functions by successive manipulations;

display means arranged to provide information representative of the data corresponding to the manipulation carried out;

control means connected to the display means and arranged so as to provide a command representative of said data, wherein it further includes a processing unit inserted between the data entry means and the control means, said processing unit including a memory for storing reference times or durations and particularly the maximum time or duration authorised between the start and end of a manipulation, designated by "Time Out", "TO" by abbreviation, a counter connected to a time base storing the time that elapses between two manipulations which is designated by "TC" and the total elapsed time "TM" between two manipulations, and comparator including a first unit, which acts on an ON/OFF switch to interrupt, via control means the energy supply to the data entry means and the display means, when TC>TO and which enables certain reference times or durations of the memory to be continuously altered at the end of a series of manipulations, wherein the display means are formed by vibrations or encoded vibration trains transmitted by the device to indicate a message to the user.

15. An interactive switching device for portable electronic apparatus powered by a battery or an accumulator and including;

data entry means enabling a user to select data or functions by successive manipulations;

display means arranged to provide information representative of the data corresponding to the manipulation carried out;

control means connected to the display means and arranged so as to provide a command representative of said data, wherein it further includes a processing unit inserted between the data entry means and the control means, said processing unit including a memory for storing reference times or durations and particularly the maximum time or duration authorised between the start and end of a manipulation, designated by "Time Out", "TO" by abbreviation, a counter connected to a time base storing the time that elapses between two manipulations which is designated by "TC" and the total elapsed time "TM" between two manipulations, and a comparator including a first unit, which acts on an ON/OFF switch to interrupt, via control means the energy supply to the data entry means and the display means, when TC>TO and which enables certain reference times or durations of the memory to be continuously altered at the end of a series of manipulations, wherein the portable electronic apparatus is a wristwatch including a case, a dial, a glass and a time base for displaying the current time when the data entry means are inactive and wherein the display means are carried by the dial and the data entry means are formed by a touch screen with transparent electrodes carried by the glass or by keys integrated in the bezel, or in the case, or in the strands of a wristband.

* * * * *